United States Patent [19]

McElroy

[11] 4,083,106
[45] Apr. 11, 1978

[54] ADJUSTABLE POLYETHYLENE PIPE OUTSIDE BEAD REMOVER

[76] Inventor: Arthur H. McElroy, 5619 E. Independence, Tulsa, Okla. 74115

[21] Appl. No.: 741,559

[22] Filed: Nov. 15, 1976

[51] Int. Cl.² .............................................. B26B 3/00
[52] U.S. Cl. ..................................... 30/280; 30/90.1; 30/293
[58] Field of Search .................. 30/94, 95, 280, 278, 30/283, 293, 90.1

[56] References Cited

U.S. PATENT DOCUMENTS

| | | | |
|---|---|---|---|
| 98,294 | 12/1869 | Peace | 30/94 |
| 402,730 | 5/1889 | Foerster | 30/94 |
| 729,816 | 6/1903 | Warnock | 30/94 |
| 843,915 | 2/1907 | Stone | 30/280 X |
| 1,763,299 | 6/1930 | Galbraith | 30/95 |
| 1,818,964 | 8/1931 | Smith | 30/280 X |
| 2,009,048 | 7/1935 | Heard | 30/280 |
| 2,018,930 | 10/1935 | Stromgren | 30/94 X |
| 3,831,279 | 8/1974 | Burns | 30/280 |

Primary Examiner—James L. Jones, Jr.
Assistant Examiner—J. T. Zatarga
Attorney, Agent, or Firm—Head, Johnson & Chafin

[57] ABSTRACT

Apparatus for removing the external bead formed when two polyethylene pipes are joined by thermal butt fusion. The apparatus comprises a frame having two arms, one of which is adapted at one end to slide on the other arm, and be maintained at an angle between the two of approximately 60°. A sharp blade is attached to the first arm which presses against the surface of the pipe and the bead at a selected angle. The frame is placed against a pipe which fits into the 60° V, with the two arms tangent to the pipe surface, the blade being at one point of tangency. While holding the frame in tight contact with the circumference of the pipe, the frame is rotated around the pipe so that the blade continually presses against the pipe at the root of the bead and removes the bead as a continuous strip. Various sizes of pipe can be handled by this device by sliding the second arm along the first arm closer to or further away from the blade, still maintaining the same 60° angle between the two arms.

3 Claims, 6 Drawing Figures

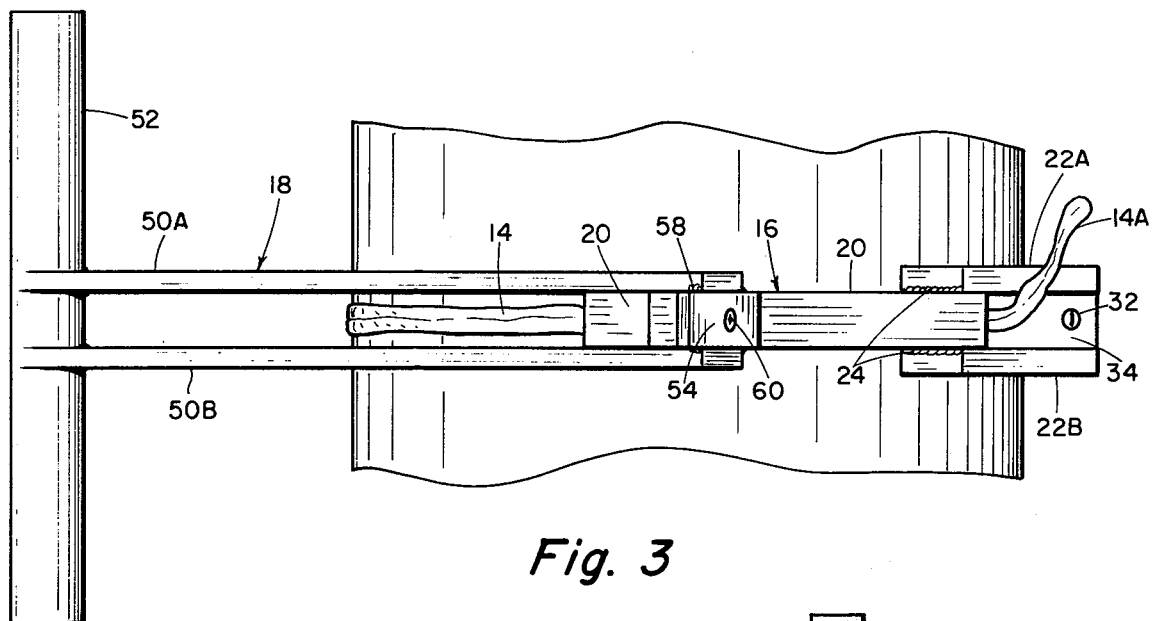
Fig. 3
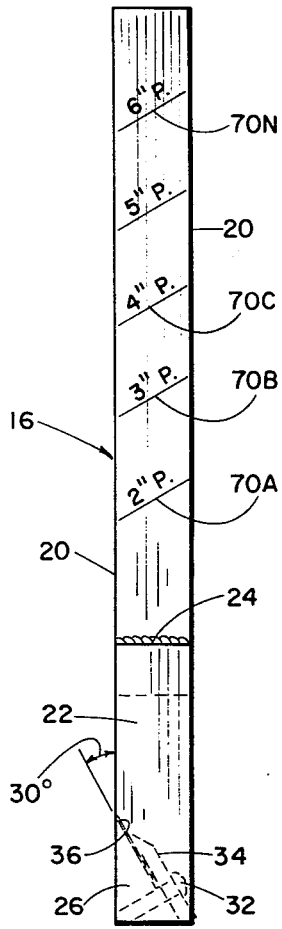
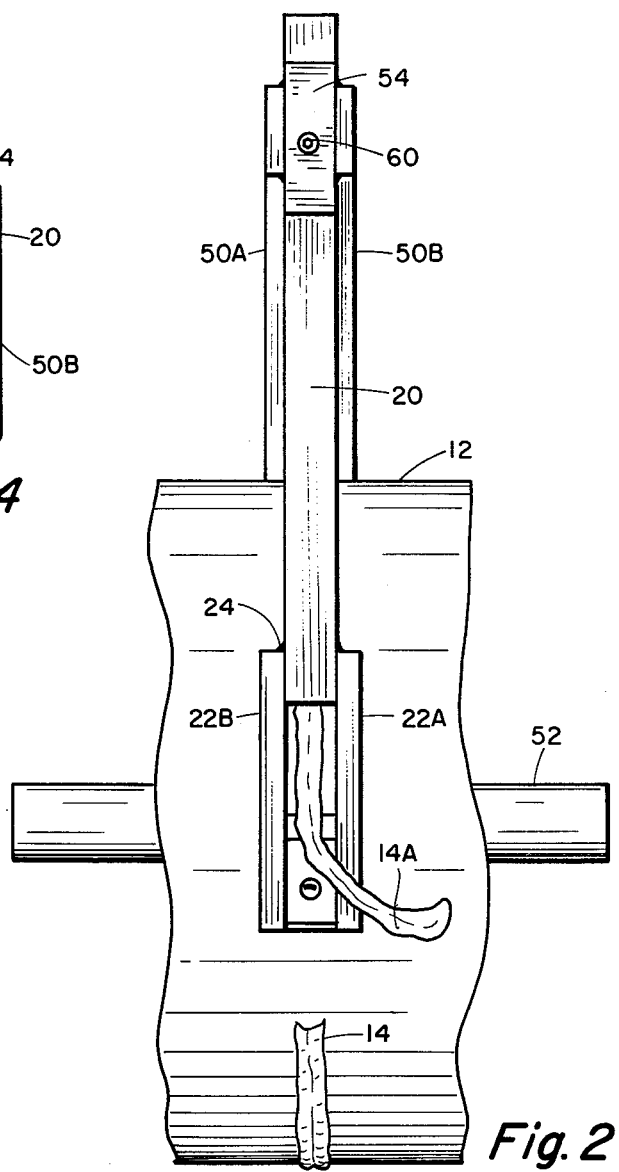
Fig. 4
Fig. 5
Fig. 2

ADJUSTABLE POLYETHYLENE PIPE OUTSIDE BEAD REMOVER

BACKGROUND OF THE INVENTION

1. Field of the Invention

This invention lies in the field of polyethylene pipe systems. More particularly, it is concerned with polyethylene pipe combinations where lengths of pipe have been joined by the butt fusion method, and in the course of joining have formed small beads on the outside and the inside surfaces of the pipe.

2. Description of the Prior Art

In the prior art, pipes have been joined by the fusion methods and little attention has been paid to the beads which have been formed. Some attention has of course been applied to the internal beads since they directly effect the flow of fluids through the pipe. Other apparatus has been designed for removing the inner bead formed by fusion joining of two pipes.

However, more recently, polyethylene pipes have been used to line larger pipes by insertion into metal pipes, which have, in the course of use, become corroded with pin hole leaks, etc. In order to insert the pipe more freely and to insert the largest possible size of pipe, it becomes important to remove the external bead so that it will slide past minor projections and crustations of rust and so on. There is also, of course, the aesthetic value of having a smooth contoured outer surface for the pipe. This invention is directed toward that end.

SUMMARY OF THE INVENTION

It is a primary object of this invention to provide an apparatus for simply and rapidly removing, by cutting away, the external bead formed at a joint between polyethylene pipes that have been joined by the butt fusion method.

It is a further object of this invention to provide an apparatus which can be easily and quickly adjusted to be applied to different sizes of pipes.

These and other objects are realized and the limitations of the prior art are overcome in this invention, by providing a frame comprising two arms the second of which is adapted to slide along the first arm, and to be maintained at a selected angle between the two arms of approximately 60°. When the frame is placed over the pipe, with the pipe within the 60° V of the frame, and the position of the second is adjusted to a selected point corresponding to the diameter of the pipe, the arms will be tangent to the surface of the pipe.

At the point of tangency of the first arm, there is positioned a sharpened blade which is attached to the first arm and is held against the surface of the pipe. When the device is rotated around the pipe the blade digs into the bead, which holds it in contact with the pipe while cutting off the bead from the pipe, in the form of a long strip. The frame is rotated around the pipe by means of a handle on the second arm, and as it is rotated the blade shears off the bead to form a smooth external surface.

BRIEF DESCRIPTION OF THE DRAWINGS

These and other objects and advantages of this invention and a better understanding of the principles and details of the invention will be evident from the following description, taken in conjunction with the appended drawings, in which:

FIGS. 2 and 3 show other views of the assembly, taken respectively in the planes 2—2 and 3—3 of FIG. 1.

FIG. 4 illustrates a view taken across the plane 4—4 of FIG. 1.

FIG. 5 illustrates a view of the first arm.

DESCRIPTION OF THE PREFERRED EMBODIMENTS

Figures 1, 6:
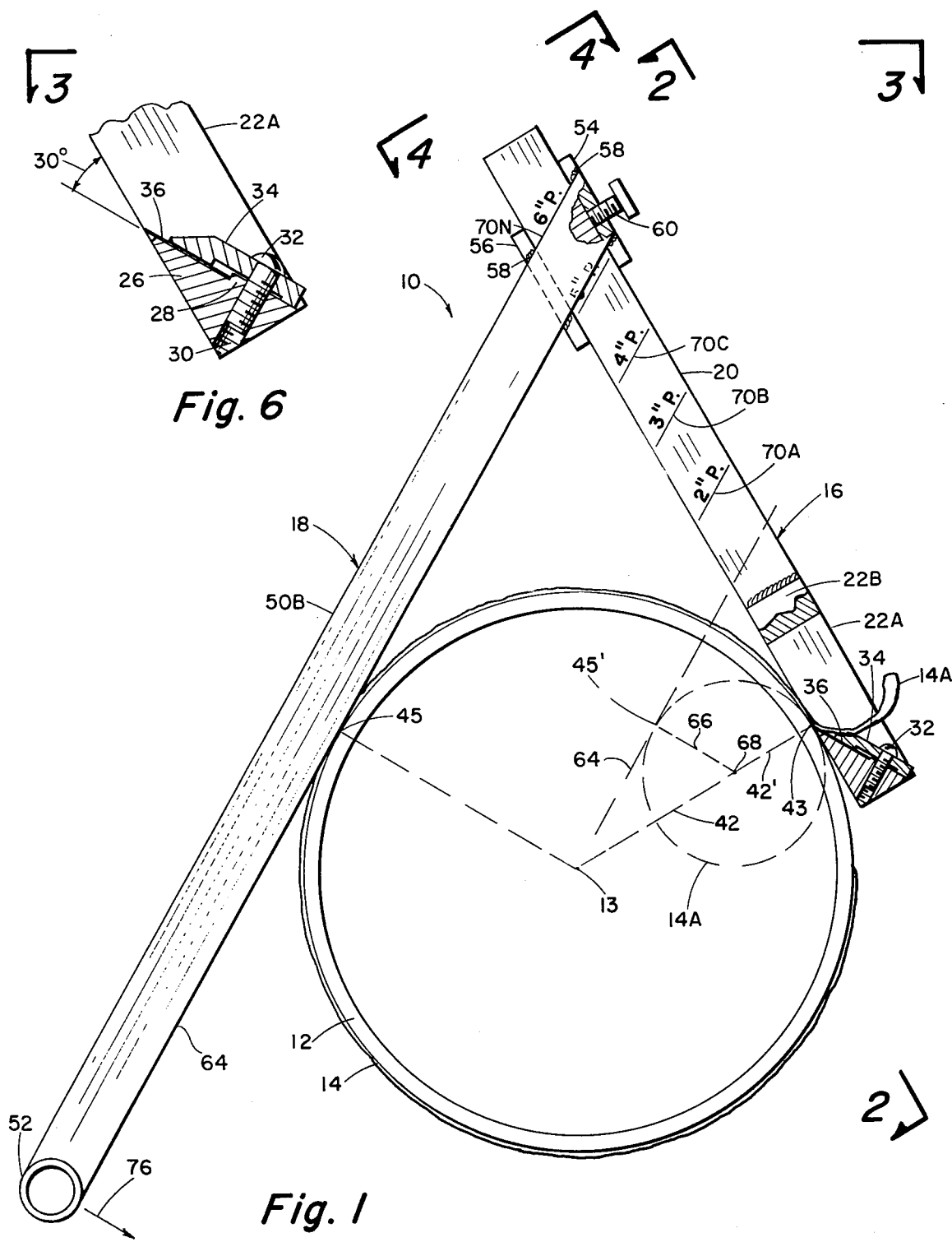
FIG. 1 illustrates an assembly of the apparatus of this invention.
FIG. 6 illustrates a detailed view of the blade holding portion of the first arm.

Referring now to the drawings, and in particular to FIGS. 1, 2 and 3, there is shown one embodiment of this invention, which comprises an adjustable frame, indicated generally by the numeral 10, having a first arm indicated generally by the numerals 16, and a second arm indicated generally by the numeral 18. The second arm is adapted at one end, to slide along the first arm in a fixed angular relation.

The first arm 16 comprises a bar of steel 20 with a pair of strips 22A and 22B attached, as by welding, at the first end. At the end of the strips 22A and 22B is attached, by welding, a triangular prism 26, which is adapted to hold a blade 36, so that the cutting edge of the blade is flush with the first edge of the first arm, so as to cut into, and slice off, the bead around the circumference of the pipe, but does not plunge into the pipe surface.

The second arm comprises a pair of flat bars 50A and 50B which are attached to two smaller plates 54 and 56, by welding 58. The combination of the two bars 50A and 50B with two plates 54 and 56 as shown in FIG. 4 forms a rectangular frame of the dimensions of the first arm, so that the second arm is adapted to slide along the first arm at various positions and various distances from the blade. One of the plates 54 has a threaded opening into which is fitted a set screw 60 which can be a thumb screw or cap screw of any desired type. The purpose of the set screw 60 is to lock the frame 54, 56, 50A, 50B at a selected point along the arm 20 (FIG. 1).

The position of the second arm along the first arm is adjustable, in order to adapt the frame to pipes of different diameters. A pipe 12 is shown having an external bead 14. When the frame is applied to the pipe 14, the two arms 20, 50 are tangent to the surface of the pipe. The first arm 20 being tangent at a point 43, which coincides with the edge of the blade 36. A radius 42 drawn from the center 13 of the pipe 12 to the point 43 is perpendicular to the first arm 20. Similarly a radius 44 drawn from the center 13 of the pipe to the point 45 is perpendicular to the second arm. The optimum angle A between the two arms is approximately 60°.

The two bars 50A and 50B which form the second arm extend from the end which slides along the first arm 20 to a handle 52 at the second end. The spacing between the two bars 50A and 50B is substantially the thickness of the first arm, which is greater than the axial length of the bead 14 as shown in FIGS. 2 and 3, so that the bars 50 rest on the circumferential surface of the pipe, with the bead 14 in between.

Further details of the first arm are shown in FIGS. 5 and 6. There are markings 70 along the length of the first arm which indicate the position of the second arm 18, corresponding to different sizes of pipes, so that given a size of pipe to be worked on, the second arm can be preset to the proper position and the set screw 60 locked to position the second arm in the proper position for that size pipe.

Shown in FIG. 1, in dashed outline, is a circle 14A, which indicates the outer surface of a pipe of a selected smaller diameter. The dashed line 64 indicates the edge of the second arm in position for that size pipe. The blade 36 is then tangent at the point 43 which is on a radius 42 from the center 68 of the circle 14A, which is perpendicular to the first arm. Similarly the radius 66 from the center to the line 64 at a point 45′, is perpendicular to the line 64.

The blade 36 is a thin plate of tool steel which is sharpened at a selected angle so as to be substantially tangential to the surface of the pipe at the point of contact 43, and to extent a slight distance beyond the inner edge of the first arm 20. The blade is held in position by clamp plate 34, preferably at an angle of 30°, which is attached by screw 32, and serves to clamp the blade 36 on the upper surface of the block 36, and hold it against the shoulder 28. Of course, other methods of attachment of the blade can be provided so long as the cutting edge is maintained at the proper position and the proper angle.

In operation the frame is set with the second arm at the proper position along the length of the first arm and locked in position. The frame is then set against the surface of the pipe with the two bars of the second arm straddling the joint, and the bead, while the blade lies directly on the bead. The handle is then moved in the direction of the arrows 76. The blade will then plunge into the bead and slit or cut the bead, as the frame rotates around the pipe 12.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by scope of the attached claim or claims, including the full range of equivalency to which each element thereof is entitled.

What is claimed:

1. Apparatus for removing the external bead from a joint formed by the fusion joining of two polyolefin pipes, comprising:
   (a) a first arm comprising
   two substantially parallel members spaced apart a distance wider than said bead and each having an inner surface to rest against the outer surface of said pipes;
   means at a first end to support a cutting blade between said members at a selected angle to said inner surface, said blade having a cutting edge flush with said inner surface;
   (b) a second arm having
   two substantially parallel members spaced apart a distance wider than said bead and each having an inner surface to rest against said outer surface of said pipes;
   means at one end to receive and retain the second end of said first arm at a selected angle less than 90°, and position depending upon the size of said pipes;
   whereby said inner surfaces of said first and second arms tangentially contact said outer surface of said pipes, straddling said bead, and rotated about said pipes in the direction toward the cutting blade, said blade will be pressed into the bead and will slit off the bead flush with said pipe outer surface as it moves along the circumference of the joint.

2. The apparatus as in claim 1 in which said selected angle between said first and second arm is approximately 60°.

3. The apparatus as in claim 1 in which said selected angle of said cutting blade is substantially 30°.

* * * * *